United States Patent
Dardas et al.

(10) Patent No.: US 10,823,072 B2
(45) Date of Patent: Nov. 3, 2020

(54) PASSIVE FUEL ADDITIVES DOSING SYSTEM

(71) Applicant: United Technologies Corporation, Farmington, CT (US)

(72) Inventors: Zissis A. Dardas, Worcester, MA (US); Haralambos Cordatos, Colchester, CT (US); Ying She, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 15/942,982

(22) Filed: Apr. 2, 2018

(65) Prior Publication Data

US 2019/0301368 A1 Oct. 3, 2019

(51) Int. Cl.
| | | |
|---|---|---|
| F02C 7/22 | (2006.01) | |
| B64D 37/34 | (2006.01) | |
| F02M 25/00 | (2006.01) | |
| F02M 37/00 | (2006.01) | |
| F02C 7/224 | (2006.01) | |
| F02M 37/04 | (2006.01) | |

(52) U.S. Cl.
CPC ............... *F02C 7/22* (2013.01); *B64D 37/34* (2013.01); *F02M 25/00* (2013.01); *F02M 37/007* (2013.01); *F02M 37/0082* (2013.01); *F02C 7/224* (2013.01); *F02M 37/04* (2013.01); *F05D 2220/323* (2013.01); *F05D 2260/607* (2013.01)

(58) Field of Classification Search
None
See application file for complete search history.

(56) References Cited

U.S. PATENT DOCUMENTS

| | | |
|---|---|---|
| 4,346,689 A | 8/1982 | Neely |
| 6,315,815 B1 | 11/2001 | Spadaccini et al. |
| 6,609,534 B1 | 8/2003 | Beaney et al. |
| 6,623,636 B2 | 9/2003 | Rohrbach et al. |
| 6,709,492 B1 | 3/2004 | Spadaccini et al. |
| 6,835,218 B1* | 12/2004 | Drozd ................. C10G 31/09 123/1 A |
| 7,159,741 B2 | 1/2007 | Dehn et al. |
| 7,393,388 B2 | 7/2008 | Spadaccini et al. |
| 7,431,818 B2 | 10/2008 | Cipollini |

(Continued)

FOREIGN PATENT DOCUMENTS

KR 101376464 B1 3/2014

OTHER PUBLICATIONS

European Search Report dated Aug. 19, 2019 for corresponding European Patent Application No. 19166494.5.

(Continued)

*Primary Examiner* — Daniel S Gatewood
(74) *Attorney, Agent, or Firm* — Bachman & LaPointe, P.C.

(57) ABSTRACT

A passive fuel additives dosing system includes a membrane-based contactor within a cartridge, an additive within the membrane-based contactor, a fuel inlet to the cartridge and a fuel outlet from the cartridge. The membrane-based contactor is arranged within the cartridge such that, with fuel in the cartridge, a fuel contact area with the membrane-based contactor is dependent on a fuel flow rate to passively dispense a proportional amount of the additive into the fuel.

10 Claims, 4 Drawing Sheets

(56) References Cited

U.S. PATENT DOCUMENTS

| | | |
|---|---|---|
| 7,744,827 B2 | 6/2010 | Vanderspurt et al. |
| 7,950,216 B2 | 5/2011 | Dooley et al. |
| 8,210,826 B2 | 7/2012 | Freeman |
| 8,702,995 B2 | 4/2014 | Kelly et al. |
| 9,103,261 B1 | 8/2015 | White et al. |
| 9,267,465 B2 | 2/2016 | Monsallier et al. |
| 9,856,788 B2 | 1/2018 | Guinther |
| 2004/0026291 A1 | 2/2004 | Drozd et al. |
| 2006/0086738 A1 | 4/2006 | Dehn et al. |
| 2007/0240649 A1 | 10/2007 | Freeman |
| 2010/0228400 A1 | 9/2010 | Johnson et al. |
| 2010/0242490 A1 | 9/2010 | Symonds |

OTHER PUBLICATIONS

European Search Report dated Jun. 12, 2020 issued for European Patent Application No. 192098473.

* cited by examiner

PASSIVE FUEL ADDITIVES DOSING SYSTEM

BACKGROUND

The present disclosure relates to a fuel system with on-board delivery of additives, and more particularly to a passive fuel additives dosing system.

Aircraft fuel systems are often utilized as a heat sink by absorbing heat from engine accessories. When air-saturated fuel is heated to temperatures above about 120 degrees C. (250 degrees F.), free radical species (coke precursors) form which initiate and propagate other autoxidation reactions leading to the formation of objectionable deposits, called "coke," "coking," "lacquering," or "varnish". As fuel temperature increases beyond about 150 degrees C. (300 degrees F.), the process of autoxidation further accelerates, consuming dissolved oxygen and forming carbonaceous deposits. The temperature at which autoxidation begins differs for different fuels. These objectionable deposits may foul surfaces for heat exchange and clog fuel system components. The increased rate of these auto-oxidation reactions becomes problematic for typical aircraft fuel system maintenance intervals. The dissolved oxygen and other heteroatoms limit the amount of heat that can be rejected to fuel. Next generation aircraft will have greater heat loads and less fuel flow to reject heat due to more efficient engine technology.

Fuel stabilization technologies require removal of dissolved oxygen, which is a root cause of carbonaceous deposits. One method for dissolved oxygen removal is a membrane-based device, but other approaches can also be deployed. As an alternative to dissolved oxygen removal, additives can provide an increase in fuel temperature up to certain limits.

Blending a very small quantity of additives in a large volume of fuel is accomplished with "dosing pumps" or similar equipment, which are common in the chemical and process industries. For aircraft, the additives are typically designed for injection into fuel at refueling truck loading racks. While the performance of the additive is proven, logistic challenges may prevent broad implementation. Furthermore, blending additives into the fuel off-board aircraft may be avoided in some situations such as, for example, naval aircraft which are because of potential interference with coalescing filters, which are utilized for water-contaminated fuel supplies.

SUMMARY

A passive fuel additives dosing system according to one disclosed non-limiting embodiment of the present disclosure includes a cartridge; a membrane-based contactor within the cartridge; a fuel inlet to the cartridge; a fuel outlet from the cartridge; and an additive within the membrane-based contactor, the membrane-based contactor arranged within the cartridge such that, with fuel in the cartridge, a fuel contact area with the membrane-based contactor is dependent on a fuel flow rate to passively dispense a proportional amount of the additive into the fuel.

A further embodiment of any of the foregoing embodiments of the present disclosure includes a bundle of hollow-fibers.

A further embodiment of any of the foregoing embodiments of the present disclosure includes that a bore of each of the hollow-fibers contains the additive.

A further embodiment of any of the foregoing embodiments of the present disclosure includes that the additive is in a concentrated solution, suspension, or emulsion form.

A further embodiment of any of the foregoing embodiments of the present disclosure includes a porous membrane.

A further embodiment of any of the foregoing embodiments of the present disclosure includes one of an organic and an inorganic membranes.

A further embodiment of any of the foregoing embodiments of the present disclosure includes that an additive inlet for inserting the additives is located at a bottom of the membrane-based contactor and is connected to a manifold at a top of the membrane-based contactor such that the membrane-based contactor is supplied by the additives continuously by gravity.

A further embodiment of any of the foregoing embodiments of the present disclosure includes that the fuel inlet is positioned with respect to the fuel outlet such that the fuel drains from the membrane-based contactor in response to a reduction in the fuel flow rate.

A further embodiment of any of the foregoing embodiments of the present disclosure includes at least one of a flat sheet module, a spiral-wound module, and a plate-and-frame module within the cartridge.

A further embodiment of any of the foregoing embodiments of the present disclosure includes that a layer of the membrane-based contactor has a thickness between 50 nanometers and about 4 microns with pores of an average pore diameter less than or equal to 0.06 microns.

A fuel system for a vehicle according to one disclosed non-limiting embodiment of the present disclosure includes a fuel tank; and a passive fuel additives dosing system within the fuel tank.

A further embodiment of any of the foregoing embodiments of the present disclosure includes a cartridge; a membrane-based contactor within the cartridge; a fuel inlet to the cartridge; a fuel outlet from the cartridge; and an additive within the membrane-based contactor, the membrane-based contactor arranged within the cartridge such that, with fuel in the cartridge, a fuel contact area with the membrane-based contactor is dependent on a fuel flow rate to passively dispense a proportional amount of the additive into the fuel.

A further embodiment of any of the foregoing embodiments of the present disclosure includes a cartridge; a fuel inlet to the cartridge; a fuel outlet from the cartridge; and means for passively dispensing a proportional amount of an additive into a fuel flow through the cartridge.

A further embodiment of any of the foregoing embodiments of the present disclosure includes that the passive fuel additives dosing system is located at a bottom of the fuel tank, with the fuel outlet adjacent to a fuel drain in the fuel tank.

A further embodiment of any of the foregoing embodiments of the present disclosure includes that the passive fuel additives dosing system is located downstream of a boost pump and upstream of an engine fuel-oil heat exchanger.

A further embodiment of any of the foregoing embodiments of the present disclosure includes that the passive fuel additives dosing system is located downstream of an engine fuel-oil heat exchanger and upstream of a filter system.

A further embodiment of any of the foregoing embodiments of the present disclosure includes that the passive fuel additives dosing system is located downstream of a filter system and upstream of a high pressure fuel pump.

A method for delivering additive on-board a vehicle, according to one disclosed non-limiting embodiment of the present disclosure includes dosing a fuel with a fuel additive from a passive fuel additives dosing system in communication with a fuel tank during operation of the vehicle, a membrane-based contactor of the passive fuel additives dosing system passively dispensing the fuel additive proportional to a fuel flow rate.

A further embodiment of any of the foregoing embodiments of the present disclosure includes locating the passive fuel additives dosing system within the fuel tank.

A further embodiment of any of the foregoing embodiments of the present disclosure includes replacing the passive fuel additives dosing system as a cartridge.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
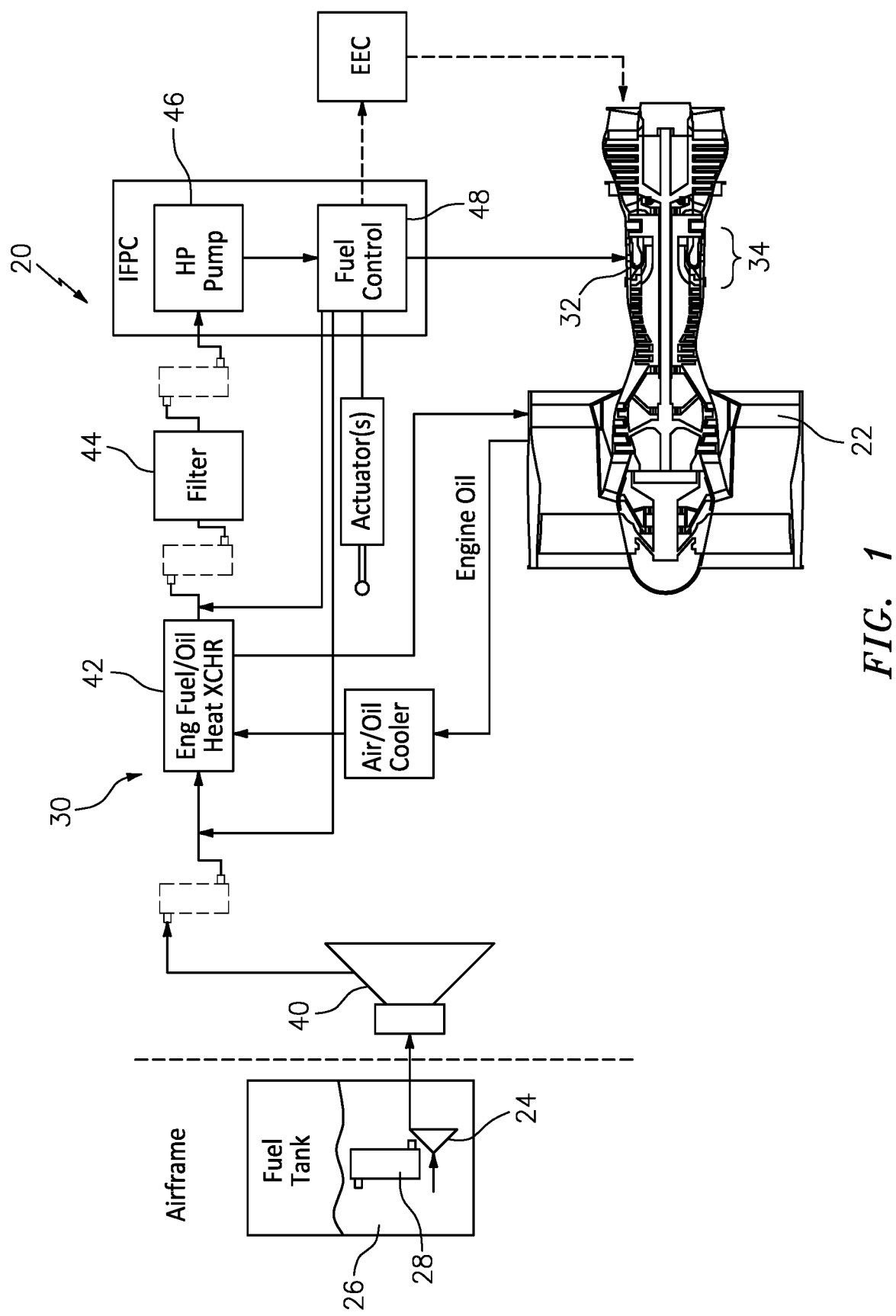
FIG. 1 is a schematic cross-section of a fuel system for a gas turbine engine.

FIG. 1 schematically illustrates a fuel system 20 for an engine 22. The engine 22 may be, for example but not limited to, a gas turbine engine utilized for propulsion of an aircraft, a gas turbine engine utilized as an auxiliary power unit (APU) or other system. To ensure that the increased heat sink capability is enabled by fuel additives, control of the additive blending operation is performed on-board the vehicle as opposed to relying on ground operations. This also avoids interference with coalescing filters, etc.

The fuel system 20 may generally include a tank pump 24 to supply fuel from a fuel tank 26 through a passive fuel additives dosing system 28 to a fuel subsystem 30, thence to a fuel manifold 32 in a combustor section 34 of the engine 22. The fuel subsystem 30, in one example, may include a boost pump 40, an engine fuel-oil heat exchanger 42, a filter system 44, a high-pressure fuel pump 46 and control system 48. The fuel subsystem 30 may alternatively or additionally include various components such as multiple fuel tanks, air-oil coolers, fuel driven actuators fuel modules, solenoid valves, metering valves, shut-off valves, spill valves, and other filters. It should be appreciated that various other systems, subsystems and components may alternatively or additionally be provided and are contemplated as included by the fuel subsystem 30. Although the passive fuel additives dosing system 28 will be described primarily as within the low pressure fuel tank 26, the passive fuel additives dosing system 28 may be directly associated with the fuel tank 26 and/or distributed elsewhere in the fuel system 20 such as downstream of the boost pump 40 and upstream of the engine fuel-oil heat exchanger 42; downstream of the engine fuel-oil heat exchanger 42 and upstream of the filter system 44; and/or downstream of the filter system 44 and upstream of the high pressure fuel pump 46.

Figure 2:
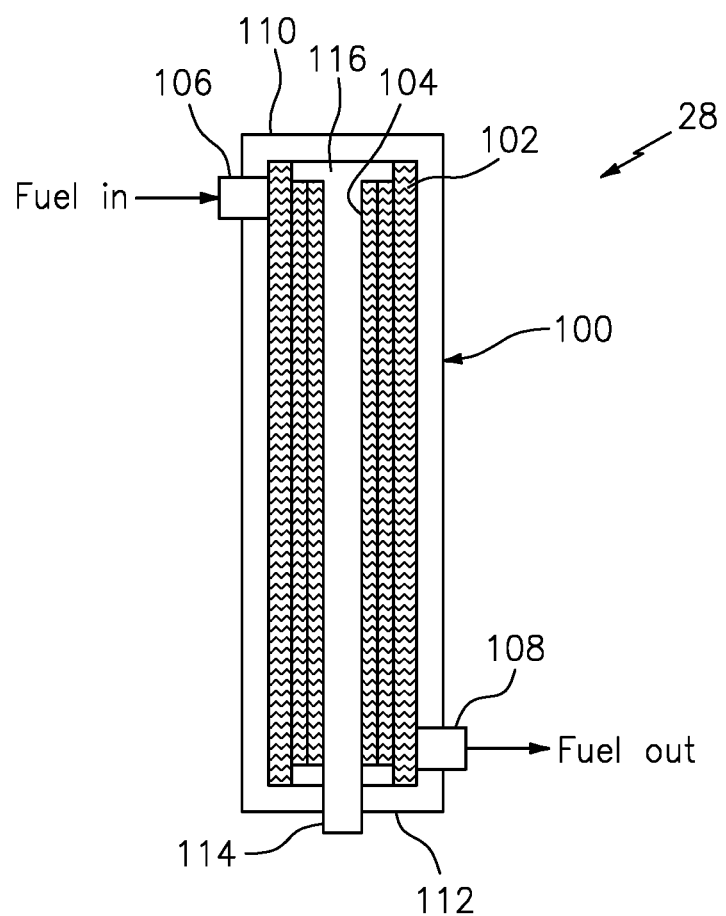
FIG. 2 is an enlarged sectional view of a passive fuel additives dosing system.

With reference to FIG. 2, the passive fuel additives dosing system 28 generally includes a cartridge 100, a membrane-based contactor 102 within the cartridge 100, and an additive 104 within the membrane-based contactor 102. The cartridge 100 includes a fuel inlet 106 and a fuel outlet 108 for communication with the fuel subsystem 30.

The membrane-based contactor 102 is arranged within the cartridge 100 such that, with fuel in the cartridge 100, a fuel contact area with the membrane-based contactor 102 is dependent on a fuel flow rate to passively dispense a proportional amount of the additive 104 into the fuel.

In one embodiment, the membrane-based contactor 102 is sized and oriented within the cartridge 100 to facilitate metering of the fuel contact area with the membrane-based contactor 102 in relation to the fuel flow rate to passively dispense the additive 104. In another embodiment, the fuel outlet 108 is arranged with respect to the fuel inlet 106 to facilitate metering of the fuel contact area. The fuel inlet 106 can be located adjacent a top 110 of the cartridge 100 and the fuel outlet 108 adjacent to a bottom 112 of the cartridge 100. This facilitates draining of the membrane-based contactor 102 once fuel flow has stopped such that osmotic pressure will not continue to drive additives into the fuel which may otherwise result in large concentrations of additives in the remaining volume of fuel. It should be appreciated that relative positional terms such as "top" and "bottom" are with respect to a normal operational attitude of the vehicle such as level flight.

The membrane-based contactor 102 may include a non-porous or a porous membrane. A non-porous membrane may be a reverse selective membrane to permeate large molecules over smaller ones, based on differences in solubility rather than diffusivity. Suitable membranes include silicone rubbers, poly-methyl pentyl, and poly-trimethyl-silyl-propyl, and other such reverse selective types. Typical polymer non-porous membranes would be unsuitable for this application as membranes such as those typically used for aircraft fuel tank inerting (based on polyimides, polysulfones or polycarbonates) would result in very low permeance of the large molecules comprising the fuel additives package as well as membranes such as those used for fuel stabilization, which are inherently oleophobic (fuel and oil repellent).

A porous membrane may comprise an oleophobic layer overcoating the outer diameter of a nanoporous polymer film to provide a barrier that facilitates prevention of the fuel from entering into the bore of each hollow fiber while the additives can exit therefrom. In one example, the porous membrane may have a thickness between about 50 nanometers and about 4 microns with pores of an average pore diameter less than or equal to 0.06 microns.

Figure 3:
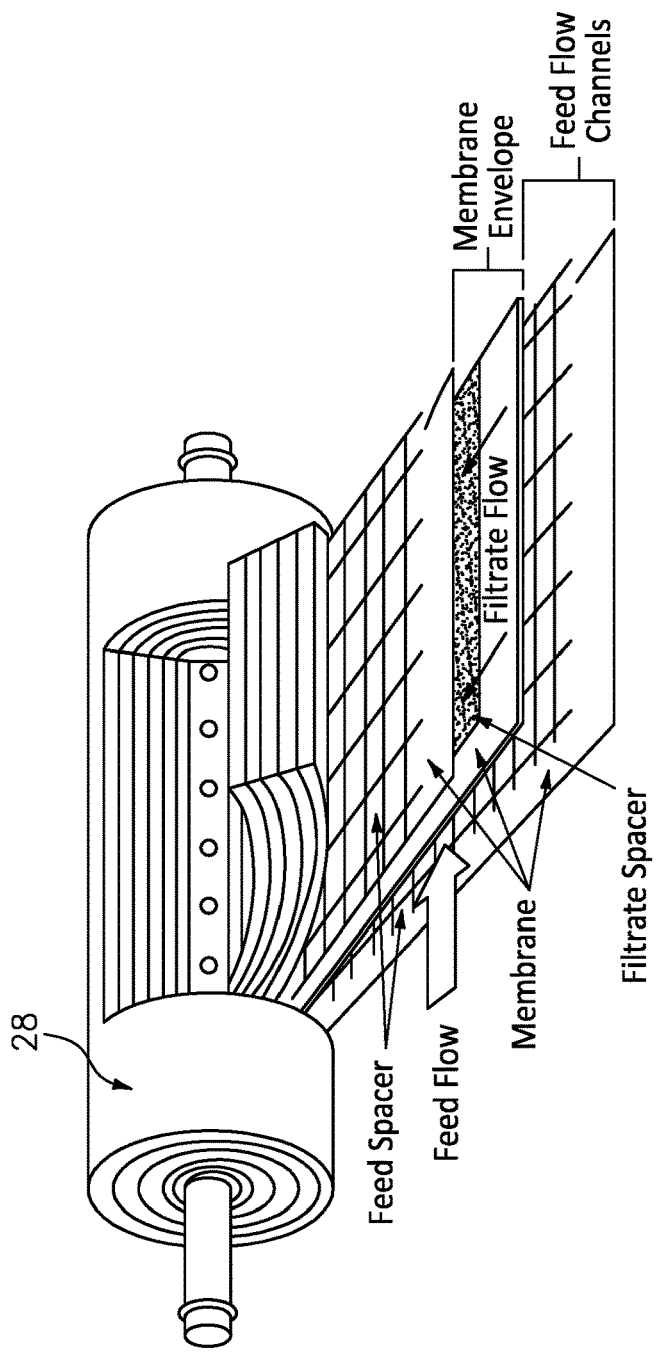
FIG. 3 is a membrane-based contactor for the passive fuel additives dosing system according to an alternative embodiment.
Figure 5:
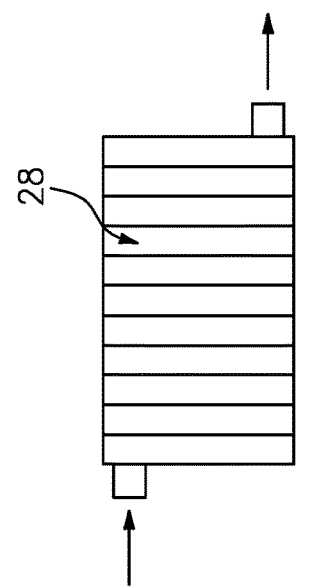
FIG. 5 is a membrane-based contactor for the passive fuel additives dosing system according to an alternative embodiment.
Figure 4:
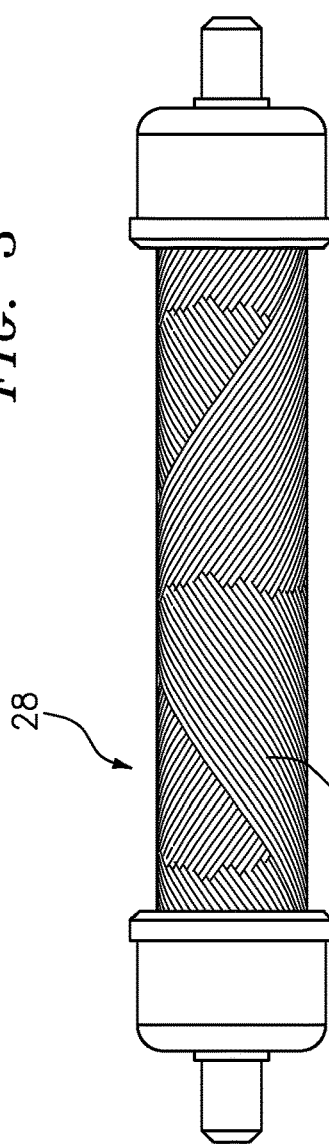
FIG. 4 is a membrane-based contactor for the passive fuel additives dosing system according to an alternative embodiment.

The membrane-based contactor 102 may be formed as a bundle of hollow fibers, in which a bore of each fiber contains the additive in a solution, suspension, or emulsion form. The relatively large surface area afforded by hollow fibers facilitates effective release of the additive when the flow rate is high. The outside surface of each hollow fiber of the bundle of hollow fibers is wetted by the fuel that enters the cartridge 100 from the fuel inlet 106 and exits from the fuel outlet 108. Each hollow fiber may include a porous support and a non-porous or porous membrane on an outer diameter of the porous support. Other forms of the membrane-based contactor 102 may be a flat sheet configuration (FIG. 3), a spiral-wound configuration (FIG. 4), or plate-and-frame configuration (FIG. 5). For the porous membrane, examples include both organic (polymeric) and inorganic (e.g. ceramic) membranes.

The additive can include anti-oxidants such as hindered phenols, metal deactivators, and dispersants that diffuse across the membrane-based contactor 102 due to the difference in osmotic pressure inside and outside of the hollow fibers. Depending on the application, some or all of the additive can be added as a concentrated liquid that is diluted to meet the specified application. The driving force for the additive to permeate the membrane-based contactor 102 is a concentration gradient (higher in the bore, lower in the fuel). Since the hollow fibers are always filled with the additive, the concentration difference between the inside (exposed to the additive) and the outside (exposed to flowing fuel) is essentially constant. Therefore, overall mass transfer is determined by the amount of membrane surface area wetted by the flowing fuel. This, in turn, is determined by the fuel flow rate and a recommended additive dosage, for example, 100 mg/L.

Figure 6:
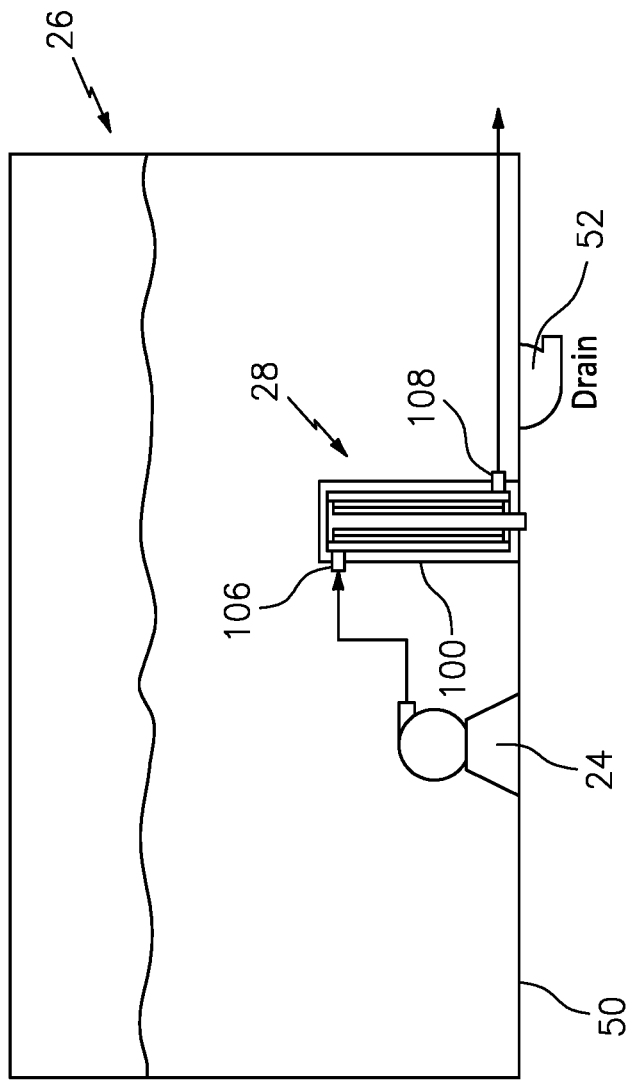
FIG. 6 is an enlarged sectional view of a fuel tank with a passive fuel additives dosing system.

The cartridge 100, in one embodiment, is located at a bottom 50 of the fuel tank 26 with the fuel outlet 108 adjacent to a tank fuel drain 52 in the fuel tank 26 to facilitate draining of fuel from the cartridge 100 (FIG. 6). An additive inlet 114 (FIG. 2) for refilling the additive is located at the bottom 112 of the cartridge 100. The additive inlet 114 communicates with a manifold 116 adjacent to the top 110 of the cartridge 100. The manifold 116 supplies additive by gravity such that the hollow fibers are always filled with the additive. Replenishment of the manifold 116 may occur over various intervals and may be conveniently performed at regular intervals as typical operators drain fuel tanks daily to avoid accumulation of water in the fuel tank. Alternatively, the entire cartridge 100 may be replaceable.

Applications for fuel stabilization include kerosene-based fuels for aviation and diesel fuel stabilization for transportation (including terrestrial and marine), heavy equipment, and power generation. The passive fuel additives dosing system 28 is a relatively uncomplicated, passive osmotic dispenser device that leverages osmotic pressure, as opposed to a power source with dosing properties tuned by the characteristics of the membrane-based contactor 102 as opposed to complex control systems.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A passive fuel additives dosing system comprising:
   a cartridge;
   a membrane-based contactor within the cartridge;
   a fuel inlet to the cartridge;
   a fuel outlet from the cartridge, wherein the fuel inlet is positioned with respect to the fuel outlet such that the fuel drains from the membrane-based contactor in response to a reduction in the fuel flow rate; and
   an additive within the membrane-based contactor, the membrane-based contactor arranged within the cartridge such that, with fuel in the cartridge, a fuel contact area with the membrane-based contactor is dependent on a fuel flow rate to passively dispense a proportional amount of the additive into the fuel, wherein the membrane-based contactor comprises a bundle of hollow-fibers, a bore of each of the hollow-fibers contains the additive.

2. The passive fuel additives dosing system as recited in claim 1, wherein the additive is in a concentrated solution, suspension, or emulsion form.

3. A passive fuel additives dosing system comprising:
   a cartridge;
   a membrane-based contactor within the cartridge;
   a fuel inlet to the cartridge;
   a fuel outlet from the cartridge, wherein the fuel inlet is positioned with respect to the fuel outlet such that the fuel drains from the membrane-based contactor in response to a reduction in the fuel flow rate; and
   an additive within the membrane-based contactor, the membrane-based contactor arranged within the cartridge such that, with fuel in the cartridge, a fuel contact area with the membrane-based contactor is dependent on a fuel flow rate to passively dispense a proportional amount of the additive into the fuel, wherein the membrane-based contactor comprises a porous membrane.

4. The passive fuel additives dosing system as recited in claim 3, wherein the porous membrane comprises one of an organic and an inorganic membrane.

5. The passive fuel additives dosing system as recited in claim 1, wherein an additive inlet for inserting the additives is located at a bottom of the membrane-based contactor and is connected to a manifold at a top of the membrane-based contactor such that the membrane-based contactor is supplied by the additives continuously by gravity.

6. The passive fuel additives dosing system as recited in claim 3, wherein the membrane-based contactor comprises at least one of a bundle of hollow-fibers, a bore of each of the hollow-fibers contains the additive, a flat sheet module, a spiral-wound module, and a plate-and-frame module within the cartridge.

7. A passive fuel additives dosing system comprising:
   a cartridge;

a membrane-based contactor within the cartridge;
a fuel inlet to the cartridge;
a fuel outlet from the cartridge, wherein the fuel inlet is positioned with respect to the fuel outlet such that the fuel drains from the membrane-based contactor in response to a reduction in the fuel flow rate; and
an additive within the membrane-based contactor, the membrane-based contactor arranged within the cartridge such that, with fuel in the cartridge, a fuel contact area with the membrane-based contactor is dependent on a fuel flow rate to passively dispense a proportional amount of the additive into the fuel, wherein a layer of the membrane-based contactor has a thickness between 50 nanometers and about 4 microns with pores of an average pore diameter less than or equal to 0.06 microns.

8. The passive fuel additives dosing system as recited in claim 7, wherein the membrane-based contactor comprises at least one of a flat sheet module, a spiral-wound module, and a plate-and-frame module within the cartridge.

9. The passive fuel additives dosing system as recited in claim 7, wherein an additive inlet for inserting the additives is located at a bottom of the membrane-based contactor and is connected to a manifold at a top of the membrane-based contactor such that the membrane-based contactor is supplied by the additives continuously by gravity.

10. The passive fuel additives dosing system as recited in claim 1, wherein the hollow fibers are always filled with the additive, and the concentration difference is essentially constant between the inside surface of the hollow fibers that is exposed to the additive and the outside surface that is exposed to flowing fuel.

* * * * *